(12) United States Patent
Mulcey et al.

(10) Patent No.: US 7,090,827 B2
(45) Date of Patent: Aug. 15, 2006

(54) PROCESS FOR IMMOBILIZING METALLIC SODIUM IN GLASS FORM

(75) Inventors: Philippe Mulcey, Bures sur Yvette (FR); Jean-Yves Frayer, Ecquevilly (FR)

(73) Assignee: Technip France, (FR)

( * ) Notice: Subject to any disclaimer, the term of this patent is extended or adjusted under 35 U.S.C. 154(b) by 483 days.

(21) Appl. No.: 10/463,920

(22) Filed: Jun. 18, 2003

(65) Prior Publication Data

US 2004/0024277 A1 Feb. 5, 2004

(30) Foreign Application Priority Data

Jun. 19, 2002 (FR) .................................. 02 07582

(51) Int. Cl.
*G21F 9/00* (2006.01)
(52) U.S. Cl. .............................. 423/659; 423/DIG. 12; 588/11; 588/12; 588/15; 588/252
(58) Field of Classification Search ................ 423/641, 423/179, 659, DIG. 12; 588/11, 12, 15, 252
See application file for complete search history.

(56) References Cited

U.S. PATENT DOCUMENTS

| | | | | |
|---|---|---|---|---|
| 3,265,627 A | * | 8/1966 | Clark et al. | 588/12 |
| 4,234,449 A | * | 11/1980 | Wolson et al. | 588/11 |
| 4,643,846 A | * | 2/1987 | Kanai et al. | 588/3 |
| 4,898,692 A | | 2/1990 | Rajan et al. | 252/629 |
| 5,461,185 A | * | 10/1995 | Forsberg et al. | 588/11 |
| 6,120,745 A | * | 9/2000 | Rahier et al. | 423/179 |
| 2004/0267080 A1 | * | 12/2004 | Maddrell | 588/11 |

FOREIGN PATENT DOCUMENTS

| | | |
|---|---|---|
| EP | 0854115 | 7/1998 |
| FR | 2404901 | 6/1979 |

OTHER PUBLICATIONS

Copy of French Search Report dated May 19, 2003.

* cited by examiner

*Primary Examiner*—Stanley S. Silverman
*Assistant Examiner*—Timothy C. Vanoy
(74) *Attorney, Agent, or Firm*—Ostrolenk, Faber, Gerb & Soffen, LLP

(57) ABSTRACT

A process for immobilizing metallic sodium in glass form. The process comprises: (A) introducing in a dispersed state, into a reactor, an amount of a vitrified matrix precursor, metallic sodium and iron oxide ($Fe_2O_3$) sufficient to ensure oxidation of the metallic sodium; (B) producing a homogeneous mixture of these constituents; (C) heating the mixture to a temperature between 1000–1600° C. to form a molten homogeneous mixture in which the sodium introduced in (A) is converted to sodium oxide; and (D) recovering and cooling the molten mixture to obtain a vitrified matrix having a homogeneous composition, which matrix incorporates the sodium introduced in (A) as a constituent oxide. In a particular embodiment, the process may be used for the containment of metallic sodium containing radioactive elements.

22 Claims, No Drawings

PROCESS FOR IMMOBILIZING METALLIC SODIUM IN GLASS FORM

The present invention relates to a process for immobilizing metallic sodium in glass form, that can be used in particular for the vitrification of metallic sodium containing radioactive elements, such as the sodium employed in the liquid state in certain nuclear plants, like for example in the primary or secondary cooling systems of nuclear reactors of the fast-neutron type.

Liquid sodium that has been employed in a nuclear plant may have variable contents of radioactive elements, such as $^{22}$Na, tritium or $^{137}$Cs. Thus, the sodium present in certain test loops of pilot reactors may contain more than 0.001 wt % of radioactive elements, whereas sodium that has been employed in a primary or secondary cooling system of a conventional nuclear reactor of the fast-neutron type is generally a slightly radioactive sodium, usually containing of the order of a few $10^{-12}$ g of radioactive elements per gram, these radioactive elements furthermore having a short half-life and stable daughter products. In any case, whatever its content of radioactive elements, sodium that has been employed in a nuclear reactor is considered, as regards the current legislation, in such form as a nuclear waste that may potentially contaminate the environment. Thus, even when it has an extremely small content of radioactive elements, this sodium is at least classed among nuclear waste referred to as being "of very low activity" (VLA). Consequently, during operations to dismantle nuclear plants employing sodium, it is necessary to store this sodium so as to prevent it from coming into contact with the external environment, whatever its degree of contamination.

In this context, it has been proposed to immobilize the sodium in a salt, silicate or oxide form within a matrix, such as a cement or a glass, in a similar manner to the storage of many radioactive or toxic wastes. However, owing to the high solubility of sodium compounds in water, one specific problem that arises when immobilizing sodium within a matrix of glass or cement type is that of the potential leaching of the sodium, namely the tendency that a glass or cement matrix may have of releasing the sodium compounds in the presence of water. Under the current standards regarding the storage of radioactive waste, it is necessary, in order to immobilize the sodium, to move towards matrices that have the lowest possible tendency of sodium leaching.

From this standpoint, glass-type matrices are generally the most promising. In the present description, the term "glass" should be taken in its most widely accepted meaning within the field of waste vitrification, that is to say a relatively homogeneous solid mixture of various mineral constituents, generally based on silica, in the form of a non-porous solid, advantageously formed from chemically and structurally bonded elements, and suitable for waste immobilization. The term "glass" within the meaning of the invention preferably denotes a solid having specifically an amorphous structure. In certain circumstances, this term may nevertheless also denote solids having a partially crystalline structure, especially of the vitreous-crystalline type, or even crystalline solids. When employed within the meaning of the present description, the term "glass-type matrix" denotes any solid matrix having a continuous phase based on a "glass" within the meaning of the invention.

Glass-type matrices have a much lower specific surface area than cement-type matrices, especially in so far as they are not porous. Consequently, they provide a greatly reduced area for exchange with the external medium. However, it should be emphasized that, in order for a glass-type matrix containing sodium compounds to be really promising in terms of limiting sodium leaching, it is generally desirable for the sodium compounds that it contains to be incorporated in the form of effective constituents of the matrix, and not as inclusions, otherwise the sodium compound is merely physically encapsulated within the glass-type matrix. In this case, the sodium compound is relatively weakly integrated into the matrix, thereby resulting in a very marked increase in the tendency of this compound to leach out.

More generally, to avoid the phenomenon of sodium within a glass-type matrix leaching out, it is desirable for the composition of this sodium-based matrix to be as homogeneous as possible. Thus, to obtain really promising vitrified matrices, it has therefore proved necessary to immobilize the sodium within these matrices under the most controlled conditions possible.

Most of the suggested solutions for achieving such immobilization of the sodium under controlled conditions consist in chemically converting the sodium into derivatives that can be incorporated into a vitrified matrix, in particular of the sodium carbonate or sodium oxide type, then in introducing these sodium derivatives into a glass formulation, before carrying out the vitrification of the mixture obtained under controlled conditions. However, the operations of chemically converting the sodium that are used in this context lead to the formation of liquid and/or gaseous effluents liable to result in radioactive elements being released into the environment. In addition, most of the radioactive sodium treatment operations proposed have the drawback of involving several successive steps, which, in addition to requiring the intermediate storage of radioactive compounds, further increases the number of liquid or gaseous effluents to be controlled, this being manifested not only in terms of high production costs, but above all in terms of increasing the risk of uncontrolled discharge into the environment.

So as to avoid such problems associated with increasing the number of liquid or gaseous effluents, one promising solution, described for example by R. Kushar et al. in the report ANL-91-21 published in 1991 by the Argonne National Laboratory, consists in mixing, within a "cyclone" reactor heated to a temperature of 1000° C., silica, alumina, quick lime and boron oxide particles with metallic sodium introduced in the form of a dispersion of droplets in the liquid state, in the presence of a stream of air introduced in an amount sufficient to oxidize the metallic sodium into the form of sodium oxide. This process makes it possible to obtain vitrified matrices of homogeneous composition and able to have low leaching rates depending on the amounts of silica, alumina, quick lime and boron oxide introduced. However, this process involves the use of large quantities of air, only some of which is consumed by the sodium oxidation reaction. This has the drawback of resulting in the production of large quantities of gaseous effluents from the reactor, which effluents are likely to convey radioactive dust, which, here again, is reflected in terms of effluent treatment costs and potential repercussions for the environment.

More generally, at the present time a vitrification process without appreciable production of gaseous elements, making it possible within a single reactor to prepare, from metallic sodium, a vitrified matrix of homogeneous composition incorporating the sodium in the form of an oxide, is unknown.

Now, the inventors have discovered that such a process could be realized by introducing, into a vitrification reactor, metallic sodium, a precursor of the final vitrified matrix, and an iron oxide $Fe_2O_3$ as oxidizing agent for the sodium provided that the sodium, the iron oxide and the precursor of the mineral matrix are specifically introduced into the reactor in a dispersed form. The inventors have demonstrated that the use of the various constituents in the dispersed state makes it possible not only to optimize the reaction of sodium oxidation by iron oxide $Fe_2O_3$, but also to obtain in fine a vitrified matrix of homogeneous composition.

On the basis of this discovery, it is an object of the present invention to provide a process for immobilizing sodium within a vitrified matrix, this process being suitable for the containment of sodium containing radioactive elements.

Within this context, one of the objects of the invention is in particular to provide a sodium immobilization process that limits any possible exchange between the contaminated sodium and the external medium.

More generally, it is also an object of the invention to provide a process for immobilizing metallic sodium in the form of a glass, this process being both simple to implement and one in which the final composition of the vitrified matrix obtained can be easily varied according to the desired properties of this matrix, especially in terms of resistance both to leaching and to devitrification.

Thus, the subject of the present invention is a process for immobilizing metallic sodium in glass form, comprising the steps consisting in:
 (A) introducing, into a reactor:
  (i) a vitrified matrix precursor,
  (ii) sodium in the metallic state, and
  (iii) iron oxide $Fe_2O_3$, in an amount sufficient to ensure oxidation of the metallic sodium (ii) introduced, the said constituents (i), (ii) and (iii) being especially introduced into the reactor in a dispersed form;
 (B) producing, by bringing constituents (i), (ii) and (iii) in dispersed form into contact with each other within the reactor, a homogeneous mixture of these constituents;
 (C) heating the mixture obtained to a temperature of between 1000 and 1600° C., preferably greater than 1200° C. and advantageously greater than 1400° C., whereby a homogeneous mixture in the molten state is formed, in which the sodium initially introduced is in the sodium oxide state; and
 (D) recovering the molten mixture thus obtained and cooling it, whereby a vitrified matrix of homogeneous composition is obtained that incorporates the initially introduced sodium as constituent oxide of the said vitrified matrix.

Within the meaning of the invention, the term "vitrified matrix precursor" is understood broadly to mean an assembly of constituents, generally solids, that are preferably inert at low temperature with respect to sodium and iron oxide, and are capable of resulting in the formation of a vitrified matrix after the heat treatment step (C) and after the cooling of step (D), in the presence of the products resulting from the reaction of sodium with iron oxide $Fe_2O_3$.

In the most general case, the mineral matrix precursor (i) of the invention may consist of any mixture of particles based on oxides, carbonates or salts commonly used in the manufacture of glasses. In this context, it may in particular be chosen from the mixtures generally denoted by the term "batch materials" employed in the manufacture of "nuclear" glasses used for the containment of radioactive wastes. Thus, the vitrified matrix precursor (i) may, for example, be formed at least partly from solid particles comprising particles based on silicon oxide $SiO_2$, generally in combination with particles based on calcium oxide CaO and/or boron oxide $B_2O_3$, optionally in combination with particles based on aluminium oxide and/or magnesium oxide, the particles based on the various aforementioned oxides possibly being particles based on only one of these oxides, or based on a combination of two or more of these oxides.

Especially so that the vitrified matrix obtained by the process of the invention has the least possible tendency to leaching and devitrification, it is generally preferred for the vitrified matrix precursor of the invention to include a mixture of particles based on:
 silicon oxide $SiO_2$; and
 calcium oxide CaO and/or boron oxide $B_2O_3$, with $SiO_2/(CaO+B_2O_3)$ mass ratios generally between 1 and 10, and preferably between 5 and 8. Boron oxide $B_2O_3$ may in particular be used to reduce the melting point of the vitrified matrix precursor (i) or to improve the mechanical integrity of the matrix during the cooling of step (D). In particular so as to further improve the properties of the glass matrix finally obtained, the precursor (i) may advantageously furthermore include compounds chosen from aluminium oxide $Al_2O_3$, magnesium oxide and zinc oxide.

Preferably, the vitrified matrix precursor of the invention comprises:
 silicon oxide in an amount from 20 to 80 wt % and preferably between 40 and 75 wt %;
 calcium oxide in an amount from 0 to 20 wt % and preferably between 1 and 10 wt %;
 alumina in an amount from 0 to 20 wt % and preferably between 1 and 10 wt %;
 boron oxide $B_2O_3$ in an amount from 0 to 20 wt % and preferably between 1 and 10 wt %.

Whatever its precise composition, the vitrified matrix precursor (i) is specifically introduced in a dispersed form into the reactor where the process of the invention takes place. Thus, it is generally introduced in the form of a mixture of particles, generally metal oxide particles, or particles of preformed glass frits, these particles preferably having a mean size of between 0.1 and 20 millimeters, advantageously less than 10 millimeters and preferably less than 5 millimeters. Thus, the vitrified matrix precursor of the invention may advantageously be employed in the form of a mixture of silica, alumina, quick lime and boron oxide particles having particle sizes of between 1 and 3 millimeters. It may also be employed in the form of glass frits, especially in the form of glass frits based on silicon, aluminium, calcium and boron oxides, these glass frits advantageously having a mean size of between 1 and 10 millimeters, and preferably less than 5 millimeters.

It should be emphasized that, given the fact that the process of the invention does not lead to an appreciable quantity of effluents being produced, this process may be carried out under rigorous containment conditions, particularly those suitable when handling radioactive compounds. Consequently, the metallic sodium used in the process of the invention may advantageously be a sodium containing radioactive elements, and it may especially be a sodium coming from a primary or secondary cooling system of a nuclear reactor of the fast-neutron type.

Whatever its exact nature, the sodium used according to the process of the invention is specifically introduced into the reactor in a dispersed form.

Thus, according to one particularly advantageous embodiment, the sodium may be introduced into the reactor in the form of liquid droplets, preferably having a size of between 10 microns and 500 microns, advantageously less than 200 microns and preferably between 50 and 150 microns, these droplets usually being obtained by spraying the liquid sodium, for example by means of an injection nozzle.

According to another possible embodiment, the sodium introduced may also come from premixing the liquid sodium in the dispersed state with at least part of the vitrified matrix precursor. In this case, the sodium in the dispersed state that is introduced is in the form of sodium deposited on vitrified matrix precursor particles. Thus, according to this particular method of implementation, the sodium in the dispersed state that is introduced in step (A) of the process may, for example, be in the form of silica particles on the surface of which sodium has been deposited.

In general, especially so as to obtain a vitrified matrix having the lowest possible tendency to leaching after the process of the invention, it is often preferable that the amount of sodium incorporated into this matrix be less than 30% by mass, and advantageously less than 20% by mass, with respect to the total mass of the matrix. It is also preferable that this amount of sodium incorporated be greater than 4% by mass, and advantageously more than 5% by mass, with respect to the total mass of the matrix. Thus, this amount is typically between 5% and 15% by mass with respect to the total mass of the matrix.

Consequently, it is generally preferable for the mass of metallic sodium introduced into the reactor to be between 3% and 20% by mass with respect to the mass of vitrified matrix precursor introduced. Advantageously, this mass of sodium introduced is less than or equal to 14% by mass, and preferably less than or equal to 12% by mass, with respect to the mass of vitrified matrix precursor introduced.

Moreover, in the particular case in which the vitrified matrix precursor is based on silicon oxide, which is generally the case, it is preferable for the molar ratio of the amount of sodium introduced to the amount of silicon introduced into the vitrified matrix precursor to be between 1/20 and 1/1, and advantageously less than 1/6.

One of the essential constituents used in the process of the invention is iron oxide $Fe_2O_3$. This constituent ensures that, within the reactor, the sodium is converted to the oxide, in which form the sodium is effectively incorporated within the vitrified matrix, specifically as a constituent element of this matrix, and not as an inclusion element. Iron is also a network former, in the same way as silicon or aluminium. In particular, iron, in the presence of these elements silicon and aluminium, forms the glassy network by interconnections. It can also result in the formation of mineral structures known to include cavities that can trap certain radioactive contaminants possibly present in the sodium. It is highly preferable for the iron oxide $Fe_2O_3$ to be introduced into the reactor in a dispersed form, especially so as to maximize the number of interfaces for contact between this oxide and the sodium, which is also introduced in a dispersed form offering a high exchange surface area. As a result, it is generally preferable for the iron oxide $Fe_2O_3$ to be introduced in the form of particles comprising iron oxide $Fe_2O_3$, these particles preferably being essentially formed from iron oxide $Fe_2O_3$, and advantageously having a mean size of between 0.1 and 20 millimeters, particularly preferably less than 10 millimeters, and advantageously less than 5 millimeters. It is preferable for the specific surface area of these particles to be as high as possible.

The amount of iron oxide $Fe_2O_3$ introduced is also a key parameter in order to ensure effective oxidation of the sodium introduced in the metallic state. This is because it is necessary for the iron oxide $Fe_2O_3$ to be introduced in an amount sufficient to ensure that this oxidation takes place. In this context, it is generally preferable for the molar ratio of the amount of iron introduced in the form of iron oxide $Fe_2O_3$ to the amount of sodium introduced to be between 0.5/1 and 3/1. Preferably, this molar ratio is greater than or equal to 0.6/1, and advantageously greater than or equal to 0.9/1. In general, it is also preferable for this molar ratio to be less than 2/1 and advantageously less than 1.5/1.

Without wishing to be tied in any way to one particular theory, it seems possible to suggest that the sodium oxidation reaction that takes place within the reactor involves the following reactions:

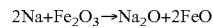

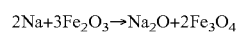

In any case, the vitrified matrix obtained in fine generally contains iron oxides FeO and/or $Fe_3O_4$ or even residual oxides $Fe_2O_3$. In particular when the process of the invention is carried out for the containment of sodium that includes radioactive elements, it is usually necessary to control the amount of iron introduced into the vitrified matrix produced according to the invention. For this purpose, it is generally preferable for the mass of $Fe_2O_3$ introduced to be between 5% and 50% by mass with respect to the mass of vitrified matrix precursor introduced, and preferably in an amount of less than 35% by mass, advantageously less than 30% by mass, and more preferably less than 25% by mass.

Whatever their exact nature and their respective proportions, constituents (i), (ii) and (iii) of step (A) of the process of the invention are generally introduced without any trace of water, so as to avoid any reaction between sodium and water, which would be liable to result both in the production of a hydrogenated gaseous effluent and in embrittlement of the vitrified matrix finally obtained. To do this, prior to their use in the process, the vitrified matrix precursor and the iron oxide $Fe_2O_3$ employed are generally dried and then stored away from any trace of moisture. The solids introduced into the reactor may be conveyed by small amounts of carrier gas. In this case, the carrier gas is generally free of any trace of water and is preferably an inert gas, such as nitrogen. This carrier gas is likely to lead to the formation of only small volumes of gaseous effluents, this being particularly advantageous when the process is carried out on sodium containing radioactive elements (limitation of secondary effluents).

Moreover, constituents (i), (ii) and (iii) of step (A) of the process of the invention are generally introduced into the reactor at a temperature ranging from 15° C. to 150° C., the sodium generally being introduced in the liquid state, that is to say at a temperature preferably greater than 100° C., usually between 110° C. and 130° C., and the other constituents being able to be introduced at lower temperatures, for example between 15° C. and 100° C., typically between 20 and 60° C.

The homogeneous mixture of step (B) of the process, produced by bringing the various constituents (i), (ii) and (iii) into contact with each other in dispersed form, is generally carried out by introducing the vitrified matrix precursor and the iron oxide into the reactor in the form of a rain of particles and by spraying the sodium in the liquid state into the said rain of particles.

The term "rain of particles" is understood, according to the invention, as meaning a descending dispersion of particles, advantageously dispersed homogeneously, of the type of those used in reactors employing reactants in powder or dispersed form. Rains of particles according to the invention may be produced using any type of standard powder dispersion system known in the prior art. The rain of particles based on the vitrified matrix precursor and on iron oxide is advantageously produced from an initial mixture of iron oxide (iii) with the vitrified matrix precursor (i), but it may alternatively be obtained by interpenetration of two or more rains of particles based on iron oxide and vitrified matrix precursor.

Another method of producing the mixture of step (B) consists in depositing the sodium on at least some of the vitrified matrix precursor particles, generally on silica particles, then in mixing constituents (i), (ii) and (iii) by interpenetration of two rains of particles comprising, in the case of one of them, particles based on $Fe_2O_3$, and, in the case of the other one, the vitrified matrix precursor particles, at least some of which have been impregnated with sodium.

Whatever its exact method of implementation, it is generally preferable, especially so as to optimize the in situ sodium oxidation reaction, for the homogeneous mixture produced in step (B) to be heated to a temperature of between 150° C. and 400° C. prior to the heat treatment of step (C).

Thus, it is generally preferable for constituents (i), (ii) and (iii) to be homogeneously mixed at a temperature below 150° C. and then to be brought under the temperature conditions of step (C), that is to say to a temperature of 1000–1600° C., preferably between 1400 and 1500° C., with an increasing temperature gradient. For this purpose, the reactor used in the process of the invention preferably has an upper part at a temperature of between 100° C. and 150° C., where mixing step (B) takes place, and a lower part under the temperature conditions of step (C), that is to say at a temperature of 1000–1600° C., and preferably at a temperature between 1400 and 1500° C., the constituents for step (A) being introduced into the upper part of the reactor where they are mixed.

According to one particular method of implementation, the reactor used in the process of the invention comprises a feed zone at a temperature of 100° C. to 200° C., a sodium oxidation zone at a temperature of 150 to 400° C., and a melting zone under the temperature conditions of step (C), that is to say at a temperature of 1000–1600° C., and preferably 1400 to 1500° C. In this case, it may prove preferable in the sodium oxidation zone for the reactor to have a frustoconical-type cross section that flares out downwards or, more generally, in the said sodium oxidation zone, for the cross section of the reactor to increase on going from the top of the reactor downwards. This is because, in so far as the oxidation of sodium is an exothermic reaction, premature vitrification leading to congealing of the reactiron mixture may be observed in the oxidatiron zone. In this situatiron, the preferred configuratiron of the reactor proposed above allows the crust of glass formed to flow towards the lower zone of the reactor under the temperature conditirons of step (C), that is to say at a temperature of 1000–1600° C., where it is melted within the reactiron mixture. This prevents a blockage of the constituents (i), (ii) and (iii) at the top of the reactor, something which would have the effect of reducing the effectiveness of the mixing of these constituents and/or of limiting the efficiency of the sodium oxidatiron reactiron.

Whatever the exact configuratiron of the reactor used in the process of the inventiron, the heat treatment step (C) may be carried out using any means, known to those skilled in the art, suitable for producing a vitrified matrix. The residence time of the mixture under the temperature conditions of step (C) must of course be long enough to bring the homogeneous mixture from step (B) under the said temperature conditions.

Step (C) of the process of the invention may be carried out, for example, by heating the walls of the reactor within which the process of the invention is carried out, especially by resistance heating. However, it is particularly advantageous for step (C) of the process of the invention to be carried out by means of induction heating.

The use of induction heating within the context of producing a glass is a known technique and one that has been widely described, this being based on the fact that the glass, which is insulating at low temperature, becomes conducting under the effect of an increase in temperature. The use of induction heating is particularly advantageous in so far as it can allow a layer of cooled glass to form on the walls of the reactor, this layer acting as a protective layer for the reactor throughout the duration of the process, this proving particularly beneficial if it is desired to carry out the process while ensuring optimum containment conditions. Such a technique, generally referred to as induction heating "in a cooled self-crucible", is also a technique widely used within the context of the vitrification of radioactive waste, and especially waste of any activity. For more information on this subject, reference may in particular be made to the articles D 5935, D 5936 and D 5937 by G. Delevey, published in Les techniques de l'ingénieur [Engineering techniques]", Génie électrique [Electrical Engineering], Volume D12.

According to one particular method of implementing the process, it is possible, during step (C), to convert at least some of the iron oxides, FeO and/or $Fe_3O_4$, resulting from the sodium oxidation reaction into the form of the oxide $Fe_2O_3$, which is more effective in forming the glass matrix than the oxides FeO or $Fe_3O_4$. To do this, oxygen is injected in a controlled manner into the mixture during step (C). The amount of oxygen used in this context is, however, preferably adapted so that all of the oxygen introduced is consumed i.e. so that the oxygen introduced is capable neither of leading to the formation of gaseous effluents nor of resulting in bubbles within the final vitrified matrix. It is often preferable to use particles (iii) of iron oxide $Fe_2O_3$ having the highest possible specific surface area.

Although steps (A) to (C) of the process of the invention are key in obtaining a homogeneous composition within the vitrified matrix obtained according to the process of the invention, step (D) of forming the vitrified matrix from the molten mixture resulting from step (C) is itself an important step, especially as regards the physical properties of the vitrified matrix obtained.

In particular if the process of the invention is intended for the containment of sodium containing radioactive elements, it is necessary for the vitrified matrix obtained to have as small a surface area as possible for exchange with the external environment. For this purpose, it is therefore necessary for the vitrified material obtained to have a high tensile strength.

Step (D) generally consists of an operation in which the mixture in the molten state (magma) from step (C) is cast into a mould or into metal containers (generally steel drums). According to another method of implementation, the magma obtained by casting may be rolled.

The cooling of the composition generally takes place under conditions such that they limit the risk of microcracks appearing by thermal shock. In this context, it is generally preferable for the composition to be cooled as slowly as possible. For this purpose, it may be envisaged, if necessary, to reduce the temperature in successive stages. Another means of limiting the risk of microcracks appearing by thermal shock consists in using boron oxide $B_2O_3$ as a constituent of the mineral matrix precursor (i).

According to one particularly advantageous method of implementation, the process of the invention may be carried out continuously, that is to say by a continuous addition of constituents (i), (ii) and (iii) into the reactor, and continuous casting of the mixture resulting from step (C) after the reactor. This possibility of carrying out the process continuously constitutes a certain advantage within the specific context of the vitrification of metallic sodium containing radioactive elements. This is because it allows the sodium to be treated using a completely confined process.

Within the context of a process carried out continuously, it is necessary, as a general rule, to form in the reactor a bath of molten glass, usually at a temperature of between 1000 and 1600° C., preferably at a temperature above 1200° C., and advantageously above 1400° C., typically between 1400 and 1500° C. This bath is generally obtained using a preliminary step consisting in introducing only vitrified matrix precursors into the reactor and in subjecting them to a heat treatment step at 1400–1500° C., this generally being carried out under the conditions of step (C) defined above. Advantageously, this glass bath is obtained by induction, preferably under the conditions of forming a "cooled self-crucible", as defined above. After the prior formation of this glass bath, constituents (i), (ii) and (iii) are added continuously, at constant flow rates, and the molten glass mixture obtained is made to flow continuously. Apart from during the start-up phase of the process, the glass composition obtained from the reactor is generally homogeneous and constant.

In the context of a process carried out continuously, it is usually preferable for the ratio of the mass flow rate of metallic sodium introduced to the mass flow rate of vitrified matrix precursor introduced to be between 0.03 and 0.3, advantageously this mass ratio is less than 0.2, and preferably less than 0.14. Typically, it is between 0.05 and 0.12. The ratio of the molar flow rate of iron introduced in the form of iron oxide $Fe_2O_3$ to the molar flow rate of sodium introduced is itself preferably between 0.5/1 and 3/1, and it is advantageously greater than or equal to 0.6/1, and preferably greater than or equal to 0.9/1. It is also preferable for this ratio of the Fe/Na molar flow rates to be less than 2/1 and advantageously less than 1.5/1. The ratio of the mass flow rate of $Fe_2O_3$ introduced to the mass flow rate of vitrified matrix precursor introduced is also generally between 0.05 and 0.5. This ratio is preferably less than 0.35, and preferably less than 0.3.

In the context of a process carried out continuously, the inflows of constituents (i), (ii) and (iii) and the outflow of the mixture in the molten state leaving the reactor may vary quite widely, depending on the amount of sodium that it is desired to treat. However, the process of the invention may achieve relatively high outflows of the molten glass composition, typically between 0.4 and 1.5 metric tons per hour. In this context, the inflows of the various constituents are generally from 15 to 160 kg per hour in the case of sodium, 60 to 540 kg per hour in the case of iron oxide $Fe_2O_3$ and 325 to 800 kg per hour in the case of the vitrified matrix precursor.

As has already been emphasized, the process of the invention is most particularly suitable for immobilizing in glass form metallic sodium containing radioactive elements, such as the liquid sodium that has been employed in a primary or secondary cooling system of a fast-neutron nuclear reactor. In this context, the process of the invention allows the containment, within the vitrified matrix, of the radioactive elements present in the sodium. In the specific context of a process carried out in the presence of radioactive elements, it is generally preferable, so as to ensure optimum sodium containment, to carry out the process in a reactor maintained under a reduced pressure, generally a pressure reduced by a few hundred Pa (a few millibars) with respect to atmospheric pressure. This reduced pressure in the reactor falls within the context of what are called "dynamic containment" measures advantageously employed in the context of the treatment of radioactive waste, which measures are aimed at preventing any release of waste into the external environment (in the event of accidental leakage, what is observed is transfer from the external environment towards the contaminated medium and not in the other direction). Maintaining a reduced pressure certainly entails very low gaseous effluent levels, but these minor effluents can be controlled in a simple and effective manner by standard means widely used in the field of the treatment of radioactive gaseous effluents, such as filters of the "ultrahigh efficiency" category or else active carbon filters.

According to one specific method of implementing the process of the invention, the metallic sodium (ii) may be introduced during step (A) together with another alkali metal in metallic form, generally metallic potassium. If necessary, the sodium (ii) is generally part of an Na/K mixture, usually in liquid form. This Na/K mixture may especially be a mixture of the type of those used in nuclear plant cooling systems and it may therefore contain radioactive elements. In this specific context, the process of the invention, advantageously carried out continuously, makes it possible to immobilize all the alkali metals present, and also the radioactive elements that they may possibly contain, in the form of a glass. When an additional alkali metal is present, the various conditions indicated above regarding the various mass and molar ratios that are preferably to be respected in order to carry out the process under optimum vitrification conditions are, however, to be adapted by transposing the data for sodium alone to the combination of alkali metals present. Thus, when operating with a mixture of several alkali metals, the total content of alkali metals incorporated into the final matrix will advantageously be less than 30% by mass and the total mass of alkali metals introduced, including the sodium (ii), will preferably be between 3 and 25% by mass with respect to the mass of precursor (i). Moreover, the amount of iron oxide (iii) employed is generally such that the molar ratio of the amount of iron introduced to the amount of alkali metals in metallic form, including the metallic sodium (ii), is between 0.5/1 and 3/1.

Whatever its specific method of implementation, it should be emphasized that the process of the invention may be carried out within a small reactor. Thus a vitrification reactor for implementing the process of the invention may be installed directly on a site during dismantling, where it may be used to treat the sodium, generally directly coming from the cooling systems, without firstly having to transport this sodium, thereby further minimizing the risk of contaminating the external environment. In this context, the process may be employed under extremely rigorous containment conditions, compatible with the current legislation regarding the treatment of nuclear waste.

Moreover, because of its simplicity of operation and the relatively inexpensive chemical compounds that it employs, the process of the invention generally requires very low operating costs.

Furthermore, provided that the nature and the proportions of the various constituents (i), (ii) and (iii) are suitably adapted, the process of the invention allows vitrified matrices to be obtained that are homogeneous in composition, stable over time, mechanically strong and barely subject, if at all, to sodium leaching and devitrification, making them the matrices of choice for the containment of sodium containing radioactive elements in the form of glass packages.

The specific use of the process described above, and in particular of such a process carried out continuously, for the containment, in a vitrified matrix, of radioactive elements present within metallic sodium or within a mixture of alkali metals including metallic sodium, constitutes a particular aspect of the present invention.

The invention claimed is:

1. A process for immobilizing metallic sodium in glass form, comprising the steps of:
   (A) introducing the following constituents, (i), (ii) and (iii) into a reactor:
      (i) a vitrified matrix precursor,
      (ii) sodium in the metallic state, and
      (iii) iron oxide $Fe_2O_3$, in an amount sufficient to ensure oxidation of the metallic sodium (ii) introduced, said constituents (i), (ii) and (iii) being introduced into the reactor in a dispersed form;
   (B) producing, by bringing constituents (i), (ii) and (iii) in dispersed form into contact with each other within the reactor, a homogeneous mixture of these constituents;
   (C) heating the mixture obtained to a temperature of between 1000 and 1600° C., whereby a homogeneous mixture in the molten state is formed, in which the sodium initially introduced is in the sodium oxide state; and
   (D) recovering the molten mixture thus obtained and cooling it, whereby a vitrified matrix of homogeneous composition is obtained that incorporates the initially introduced sodium as constituent oxide of the said vitrified matrix.

2. The process of claim 1, wherein the metallic sodium employed contains radioactive elements.

3. The process of claim 1, wherein the vitrified matrix precursor (i) includes solid particles, said particles containing at least one oxide selected from the group consisting of:
   silicon oxide $SiO_2$;
   calcium oxide CaO and boron oxide $B_2O_3$.

4. The process of claim 3, wherein the particles present in the vitrified matrix precursor have a mean size of between 0.1 and 20 millimeters.

5. The process of claim 1, wherein the metallic sodium employed is introduced into the reactor in the form of liquid droplets.

6. The process of claim 1, wherein the metallic sodium employed is introduced in the form of sodium deposited on all or a part of the particles of present in vitrified matrix precursor.

7. The process of claim 1, wherein the mass of metallic sodium introduced is between 3% and 20% by mass with respect to the mass of vitrified matrix precursor which is introduced.

8. The process of claim 1, wherein the iron oxide $Fe_2O_3$ is introduced in the form of particles comprising iron oxide $Fe_2O_3$ and having a mean size of between 0.1 and 20 millimeters.

9. The process of claim 1, wherein the molar ratio of the amount of iron introduced in the form of iron oxide $Fe_2O_3$ to the amount of sodium introduced is between 0.5/1 and 3/1.

10. The process of claim 1, wherein the mass of $Fe_2O_3$ introduced is between 5% and 50% by mass with respect to the mass of vitrified matrix precursor introduced.

11. The process of claim 1, wherein the operation of producing the homogeneous mixture in step (B) is carried out by introducing the vitrified matrix precursor and the iron oxide into the reactor in the form of a rain of particles and by spraying the sodium in the liquid state into the said rain of particles.

12. The process of claim 1, wherein the homogeneous mixture produced during step (B) is heated to a temperature of between 150° C. and 400° C. prior to the heat treatment of step (C).

13. The process of claim 1, wherein step (C) is carried out by means of induction heating.

14. The process of claim 1, wherein the said process is a process carried out continuously.

15. The process of claim 14, wherein the ratio of the mass flow rate of metallic sodium introduced to the mass flow rate of vitrified matrix precursor introduced is between 0.03 and 0.3 to 1.

16. The process of claim 14, wherein the ratio of the molar flow rate of iron introduced in the form of iron oxide Fe2O3 to the flow rate of sodium introduced is between 0.5/1 and 3/1.

17. The process of claim 1, wherein the ratio of the mass flow rate of Fe2O3 introduced to the mass flow rate of vitrified matrix precursor introduced is between 0.05 and 0.5 to 1.

18. The process of claim 1, wherein said process is carried out in a reactor maintained under reduced pressure.

19. The process of claim 1, wherein that, during step (A), the metallic sodium (ii) is introduced in conjunction with another alkali metal in metallic form.

20. A method for the containment, in a vitrified matrix, of radioactive elements present within metallic sodium, which implements the process of claim 1.

21. A method for the containment, in a vitrified matrix, of radioactive elements present within a mixture of alkali metals, including metallic sodium, which implements the process of claim 19.

22. The process of claim 21, wherein the metallic sodium is introduced in the form of a Na/K mixture containing radioactive elements.

* * * * *